United States Patent [19]

Sasaki

[11] Patent Number: 4,788,546
[45] Date of Patent: Nov. 29, 1988

[54] ELECTROSTATIC CAPACITY TYPE ENCODER

[75] Inventor: Kouji Sasaki, Kanagawa, Japan

[73] Assignee: Mitutoyo Mfg. Co., Ltd., Tokyo, Japan

[21] Appl. No.: 107,905

[22] Filed: Oct. 9, 1987

Related U.S. Application Data

[63] Continuation of Ser. No. 791,901, Oct. 28, 1985, abandoned.

[30] Foreign Application Priority Data

Oct. 29, 1984 [JP] Japan .................................. 59-228785

[51] Int. Cl.⁴ .......................................... G01R 27/26
[52] U.S. Cl. ........................... 340/870.37; 324/60 CD
[58] Field of Search .......... 340/870.37, 365 C, 365 R; 324/60 CD, 60 C, 61 R, 65 R, 207, 208; 308/10

[56] References Cited

U.S. PATENT DOCUMENTS

| | | | |
|---|---|---|---|
| 3,303,701 | 2/1967 | Matsura et al. | 340/870.37 |
| 3,543,259 | 11/1970 | Klyce | 340/870.37 |
| 3,668,672 | 6/1972 | Parnell | 340/870.37 |
| 3,723,866 | 3/1973 | Michaud et al. | 340/870.37 |
| 3,961,318 | 6/1976 | Farand et al. | 340/870.37 |
| 4,223,300 | 9/1980 | Wiklund | 340/870.32 |
| 4,294,321 | 10/1981 | Wittlinger et al. | 324/61 R |
| 4,300,093 | 11/1981 | Ogasawara et al. | 324/61 R |
| 4,339,709 | 7/1982 | Brihier | 324/61 R |
| 4,420,754 | 12/1983 | Anderno | 340/870.37 |
| 4,451,780 | 5/1984 | Ogasawara | 324/61 R |
| 4,471,450 | 9/1984 | Arnason et al. | 340/870.37 |

Primary Examiner—John W. Caldwell, Sr.
Assistant Examiner—Mahmoud Fatahi-Yar
Attorney, Agent, or Firm—Koda and Androlia

[57] ABSTRACT

An electrostatic capacity type encoder which includes a rotary disk rotatingly provided on an encoder body, and a first stationary disk and a second stationary disk fixed to the encoder body to face each other with the rotary disk arranged therebetween. A plurality of transmitting electrodes are provided on the first stationary disk. On the rotary disk is provided not only a plurality of receiving electrodes facing the transmitting electrodes on the first stationary disk but also a coupling electrode connected to the receiving electrodes and facing the second stationary disk. An output electrode is provided on the second stationary disk to face the coupling electrode on the rotary disk. To the respective transmitting electrodes are applied alternating currents with respective different phases, and the amount of rotating displacement in the rotary disk is detected in accordance with the output signal from the output electrode which changes with the rotation of the rotary disk.

2 Claims, 8 Drawing Sheets

ELECTROSTATIC CAPACITY TYPE ENCODER

This is a continuation of application Ser. No. 791,901, filed Oct. 28, 1985, now abandoned.

BACKGROUND OF THE INVENTION

1. Field of the Invention

The present invention relates to an electrostatic capacity type encoder, and more particularly to an improvement of the electrostatic capacity type encoder which electrically detects relative rotary displacement of a rotary disk.

2. Prior Art

In the prior art device exits a measuring apparatus using an encoder which converts the displacement of a probe moving on the apparatus itself and being brought in contact with an object to be measured into a electric signal output pulse to be counted by a counter, for example, so that a counter value can be displayed on the display instrument as a digital representation of measured value.

As for the encoder to be used for this kind of measuring apparatus, there has been used an electrostatic capacity type encoder wherein at least a pair of electrode plates are arranged to face each other to form a capacitor. Both of the electric plates are relatively moved in accordance with the displacement of the probe, and the mechanical displacement is electrically detected as a change in electrostatic capacity of the capacitor.

In such encoder, however, since a tap circuit (voltage dividing circuit) is formed by the capacitor consisting of the relatively moving electrodes and the displacement of the probe is detected on the basis of tap ratio which changes in accordance with the electrostatic capacity of the capacitor, the tap output does not correspond and follow the displacement of the probe with accuracy so that the measurement of the probe cannot be performed with high accuracy, when the changes in distace between the moving electrode plates forming the capacitor fluctuates to change the electrostatic capacity, and when the voltage of power supply changes which is applied to the tap circuit.

In the prior art device, furthermore, an electrostatic capacity type encoder is offered to solve such disadvantages as mentioned above. In this encoder a plurality of transmitting electrodes are arranged with an equal distance therebetween and applied there to is an alternating current having predetermined differed phases, and on the opposide side of these transmitting electrodes is provided the receiving electrodes. In this encoder the relative displacement between the transmitting electrode and the receiving electrode is detected through the receiving electrode so that the electrostatic capacity signal period can be obtained therefrom.

Figure 6:
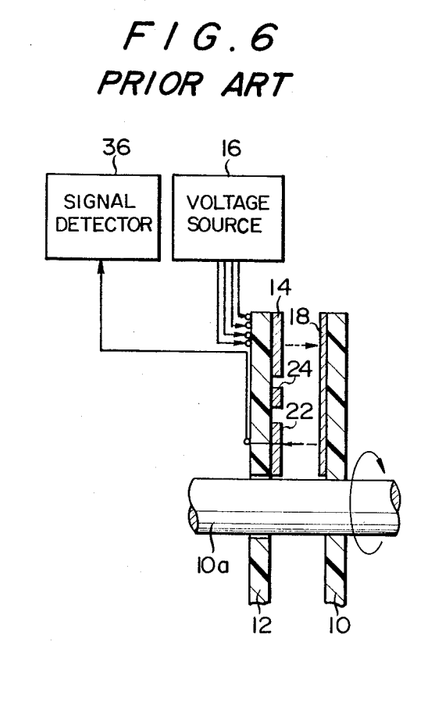
FIGS. 6 and 7 are illustrations showing the embodiment of the electrostatic capacity type encoder in the prior art device.
Figure 7:
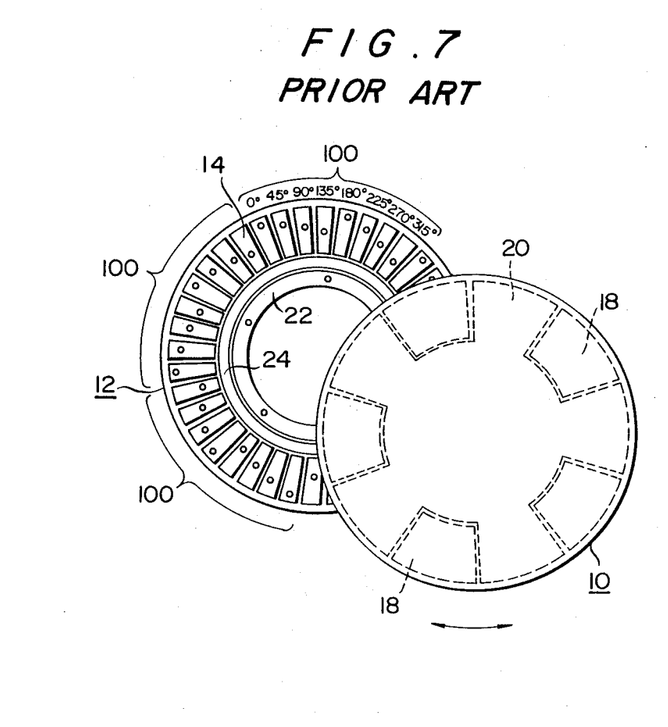

In FIGS. 6 and 7 shown therein is such an electrostatic capacity type encoder in the prior as is mentioned above. This encoder includes a disk plate 10 fixed to a rotary shaft 10a rotatingly attached to the body, and a stationary disk arranged on the body to face the rotary disk 10 in order to detect the amount of the rotating displacement in the rotary disk 10 relative to the stationary disk 12.

Accordingly, on the surface of the stationery disk 12 is provided a plurality of transmitting electrodes 14 at an equal distance therebetween along the circumference direction. To these electrodes 14 a voltage applying circuit 16 is connected to apply the alternating current of sinusoidal wave or rectangular wave shape one after another with differed phases by a predetermined value, for example $\pi/4$ in the embodiment, and plural units of electrode group 100 are formed with 8 phase electrodes as one unit.

On the other hand, on the surface of the rotary disk 10 is provided the same number of the receiving electrode 18 with the units of electrode group 100 so that they can face to a series of predetermined transmitting electrodes 14 included in the respective units of the electrode group 100. In the embodiment shown in FIG. 7, the receiving electrode 18 is facingly arranged to span four consecutive transmitting electrode 14, that is, the transmitting electrode which a standard $V_1$ is applied thereto and the transmitting electrodes to which the respective voltages $V_2$, $V_3$ and $V_4$ are applied with the phases differed by $\pi/4$, $2\pi/4$ and $3\pi/4$ from the standard voltage $V_1$.

Furthermore, on the surface of the rotary disk 10, a ground electrode 20 is provided between the respective receiving electrodes 18 at a position facing the transmitting electrode 14 to which applied are the voltage with the phases differed by $4\pi/4$, $5\pi/4$, $6\pi/4$ and $7\pi/4$ from the standard voltage $V_1$ to prevent interference with the electrostatic capacity for occurring between the respective receiving electrodes 18 and other sources.

In the composition described above, when the rotary disk 10 is rotated, an electrostatic capacity signal is detected with a periodical change in accordance with the amount of rotating displacement in the rotary disk 10 from the receiving electrodes 18 by means of relative movement between the transmitting electrodes 14 and the receiving electrodes 18.

Figure 8:
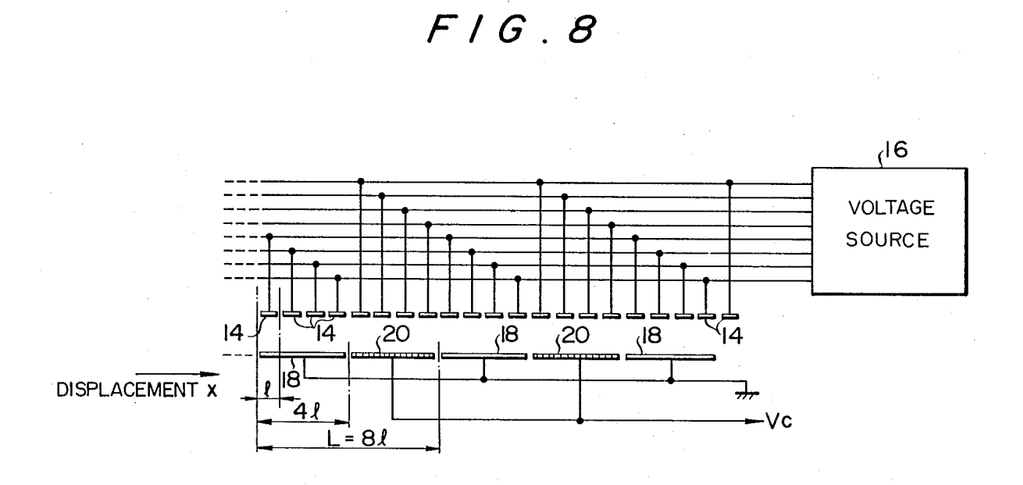
FIGS. 8 and 9 are illustrations describing the general fundamentals of the electrostatic capacity type encoder.
Figure 9:
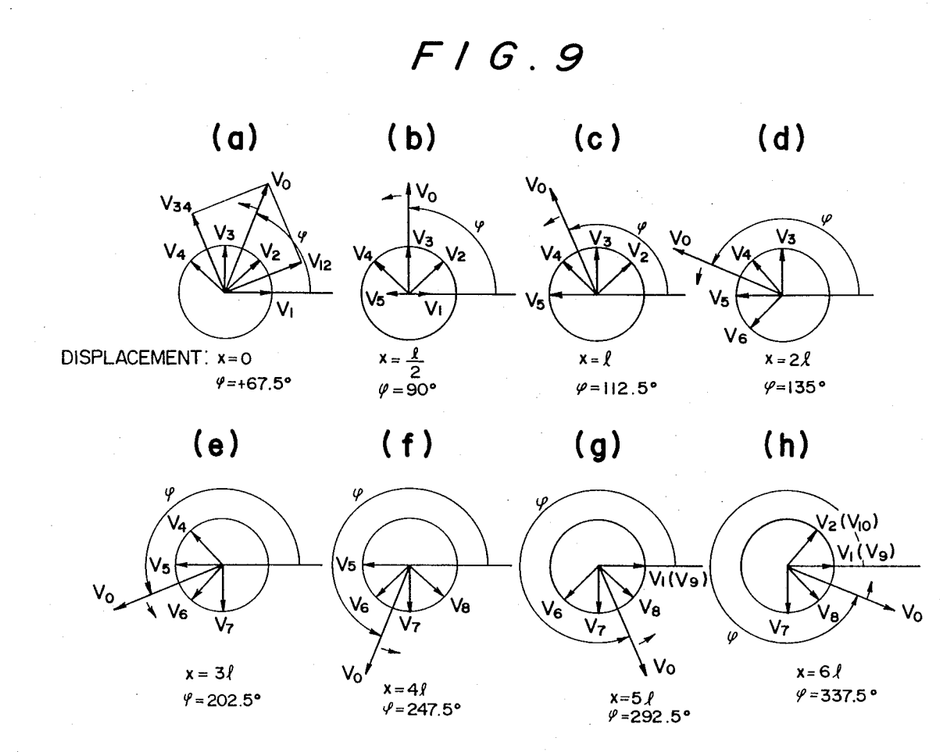

FIG. 8 is a sham illustrating rectilinearly expanding the relative position among the transmitting electrodes 14, the receiving electrodes 18 and the ground electrodes 20 in the encoder shown in FIGS. 6 and 7. FIG. 9 shows vector illustrations of various periodical changes in the electrostatic capacity signal obtained through the receiving electrodes 18.

The detected voltage $V_0$ of the electrostatic capacity signal corresponds to the composite voltage vector of the respective transmitting electrodes 14 which the receiving electrodes 18 face. Accordingly, the amount of rotating displacemeent in the rotary disk 10, in other words, the relative displacement between the transmitting electrodes 14 and the receiving electrodes 18, can be obtained by detection of the phase difference in the composite vector $V_0$ from the standard voltage $V_1$.

In other words, each of the transmitting electrodes 14 has a width l and the receiving electrodes 18 are respectively formed having a width of 4l. When the position of the rotary disk 10 to the stationary disk 12 is in the state shown in FIG. 8, the voltage $V_0$ is outputted in accordance with the addition of the voltage vectors $V_1$, $V_2$, $V_3$ and $V_4$ applied from the receiving electrodes 18 to the respective transmitting electrodes 14, and the o of $V_0$ relative to $V_1$ is detected as the phase difference as is shown in FIG. 9(a).

In the next stage, when the rotary disk 10 rotates and the receiving electrodes 18 move by l/2 with respect to the transmitting electrode 14, $V_0$ is detected to be advanced by $\phi=90$ degrees in comparison with $V_1$, as is shown in FIG. 9(b). When the rotary disk 10 further rotates so that the receiving electrodes 18 move by l from the initial stage, the phase of the electrostatic capacity signal advances as shown in FIG. 9(c) in the same manner. When the receiving electrodes 18 move by 2l, 31, 41, 51 and 61, the phases of the electrostatic capacity signal advance as shown in FIGS. 9(d)-9(h) in comparison with $V_1$.

Accordingly, detection of the phase difference $\phi$ from the standard voltage $V_1$ in the electrostatic capacity signal provides the displacement of the receiving electrodes 18 relative to the transmitting electrodes, that is, the amount of rotating displacement in the rotary disk 10 relative to the stationary disk 12.

However, there is a problem in the way of picking up the electrostatic capacity signal which is produced from the receiving electrodes 18 from the side of the rotary disk 10.

In the encoder in the prior art device, as shown in FIG. 7, an output electrode 22 in a ring shape is provided in the inside of the transmitting electrodes 14 on the surface of the stationary disk 12. The receiving electrodes 18 provided on the rotary disk 10 are formed to face the output electrode 22 provided on the stationary disk 12 to couple both of the electrodes 18 and 22 electrically.

According to the composition mentioned above, this encoder is capable of outputting the electrostatic capacity signal shown in FIG. 9 obtained from the receiving electrodes 18 by electrostatic coupling without using mechanical contact between the rotary disk 10 and the stationary disk 12.

Therefore, according to the conventional electrostatic capacity type encoder, the displacement in the rotary disk 10 can be measured with simple composition and high accuracy.

In the recent years, however, it has been requested to design the electrostatic capacity type encoder to be smaller in size and lighter in weight without decreasing the accuracy in order to increase portability and operational capabilities of the device.

In order to obtain preferable accuracy in the electrostatic capacity type encoder, it is necessary to establish suitable electrode dimensions and intervals between the respective electrodes, specifically, the transmitting electrodes 14 in accordance with the required resolution.

In the electrostatic capacity type encoder in the prior art device, however, since both the transmitting electrodes 14 and the output electrode 22 are provided together on the stationary disk 12, it is necessary to enlarge the dimensions of the rotary disk 10 and its facing stationaery disk 12 in order to increase the accuracy. Consequently, there is such a disadvantage that the device cannot be designed to be smaller in size in the radial direction.

In the conventional electrostatic capacity type encoder, since the transmitting electrodes 14 and the output electrode 22 are adjacently arranged on the same stationary disk 12, interference with the electrostatic capacity results from interaction which occurs between the electrodes 14 and 22, and therefore, the output signal includes some noise.

In order to solve the problem mentioned above, it is necessary to establish a suitable distance between the transmitting electrodes 14 and the output electrode 22 and to provide a ground electrode 24 in the ring shape between the electrodes 14 and 22. Consequently, it is inevitable that the stationary disk 12 becomes larger and more complicated in its shape, and there is a drawback in that the device cannot be designed small enough.

Figure 10:
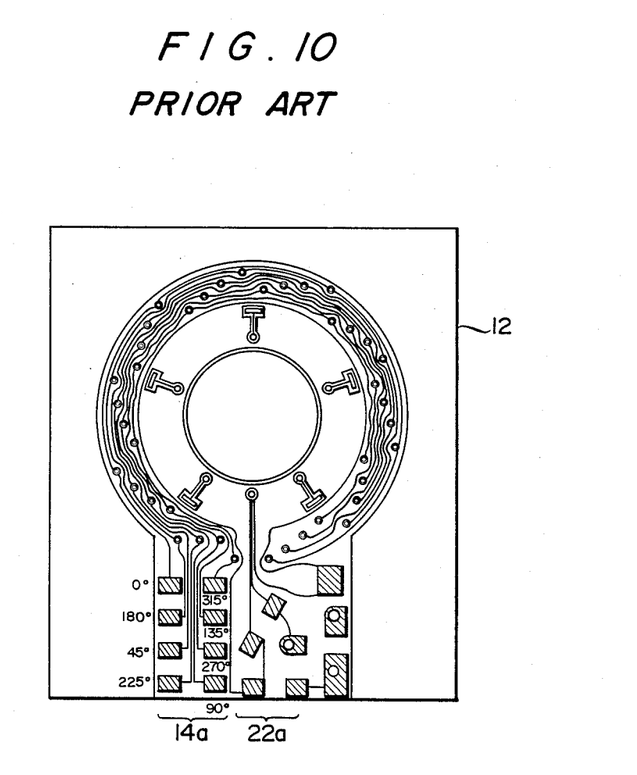
FIG. 10 is an illustration showing the wiring to the transmitting electrodes and the output electrode of the electrostatic capacity type encoder in the prior art.

Furthermore, in this kind of electrostatic capacity type encoder, the transmitting electrodes 14 and the output electrode 22 are provided on the stationary disk 12, and electric circuits 14a and 22a of the respective electrodes 14 and 22 must be adjacently arranged in a complicated manner on the back side of the stationary disk 12, as is shown in FIG. 10. Consequently, both of the circuits 14a and 22a interfere with each other, and it is inevitably disadvantageous that the noise therefrom decreases the accuracy. As the voltage applying circuit 16 and the signal detector 36 to be connected with the transmitting electrode 14 and the output electrode 22 must be placed at a certain distance apart so as not to pick up noise from each other, more space is required to place these electric circuits, which become a problem in minimizing the total size of the device.

SUMMARY OF THE INVENTION

Accordingly, it is an object of the present invention to provide an electrostatic capacity type encoder which enables the device to be designed to be smaller is size, and further which can detect the amount of rotating displacement in a rotary disk with high accuracy.

In keeping with the principles of the present invention, the object is accomplished with an electrostatic capacity type encoder which includes a rotary disk rotatingly provided on its bodys and a first stationary disk and second stationary disk fixed to its body so that these stationary disks can be arranged to face each other with a rotary disk therebetween.

A plurality of transmitting electrodes are arranged at an equal distance therebetween along the circumference direction on the first stationary disk.

On the rotary disk is provided thereon receiving electrodes arranged to face the transmitting electrodes as well as a coupling electrode in a ring shape which is electrically connected to the receiving electrodes and faces the second stationary disk.

On the second stationary disk is provided thereon an output electrode positioned to face the coupling electrode.

To each of the above mentioned transmitting electrodes are respectively applied alternating current with different phases in order to detect the amount of rotating displacement in accordance with an output signal from the output electrode which changes with the rotation of the rotary disk.

As the distance between the firt and the second stationary disks and the rotary disk is extremely narrow, the thickness to the rotary shaft direction is not much differnet in comparison with the one of a conventional encoder which is composed of only the rotary disk and the stationary disk, even if the first and the second stationary disks are arranged to face each other with the rotary disk therebetween, as is shown in the present invention.

According to the present invention, since the transmitting electrodes and the output electrode are provided on separate stationary disks, the transmitting electrodes 14 and the receiving electrodes 18 can be arranged on stationary disks which have smaller dimensions with more space so that the encoder can be designed to be smaller in size.

According to the present invention, since the transmitting electrodes 14 and the output electrode 22 are provided on separate stationary disks, the electric circuits for the transmitting electrodes and the output electrode can be arranged freely on their respective stationary disks and the distance between these circuits can be set wide enough so that noise from the interference in the electrostatic capacity does not mix into the output electrode circuit and the amount of rotating displacement in the rotary disk can be detected with high accuracy.

According to the present invention, furthermore, the trodes is provied on the first stationary disk and the electric circuit processing the signal from the output voltage is placed on the second stationary disk. Such a separate arrangement of the respective electric circuits from each other does not interfere with each other and can prevent a decrease in the accuracy cause by the mixture of noise thereinto.

As described heretofore, according to the electrostatic capacity type encoder of the present invention, it becomes possible to design a device smaller in size and to increase the detective accuracy.

DETAILED DESCRIPTION OF THE INVENTION

The preferred embodiment of the present invention will be hereinafter described in accordance with the accompanying drawings. The like elements corresponding to the prior art device shown in FIGS. 6-10 are denoted with like numerals and their description will be omitted.

Figure 1:
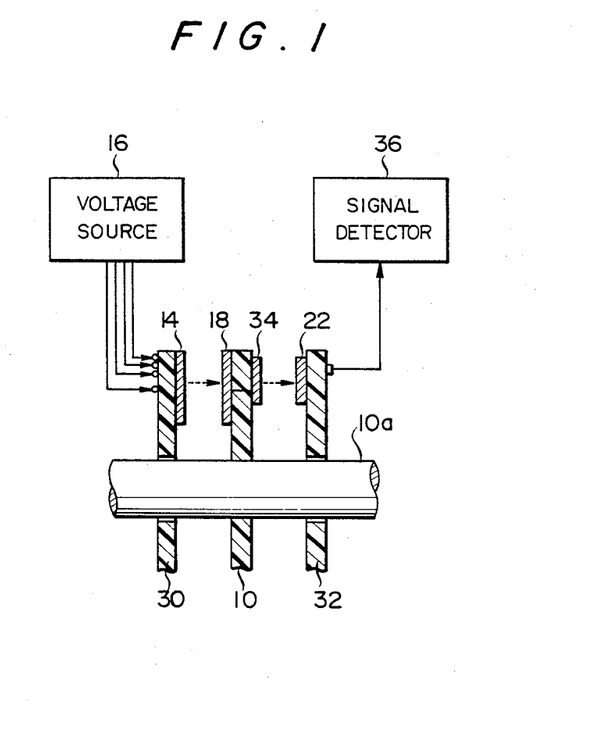
FIG. 1 is an illustration describing a preferred embodiment of an electrostatic capacity type encoder in accordance with the teachings of the present invention.

FIG. 1 shows a preferred embodiment of an electrostatic capacity type encoder in accordance with the teachings of the present invention. The encoder in the present invention includes a rotary disk 10 mounted on a rotary shaft 10a rotatingly attached to the body of the device, and the first stationary disk 30 and the second stationary disk 32 are fixed to the body so that they face each other with the rotary disk 10 arranged therebetween.

Figure 2:
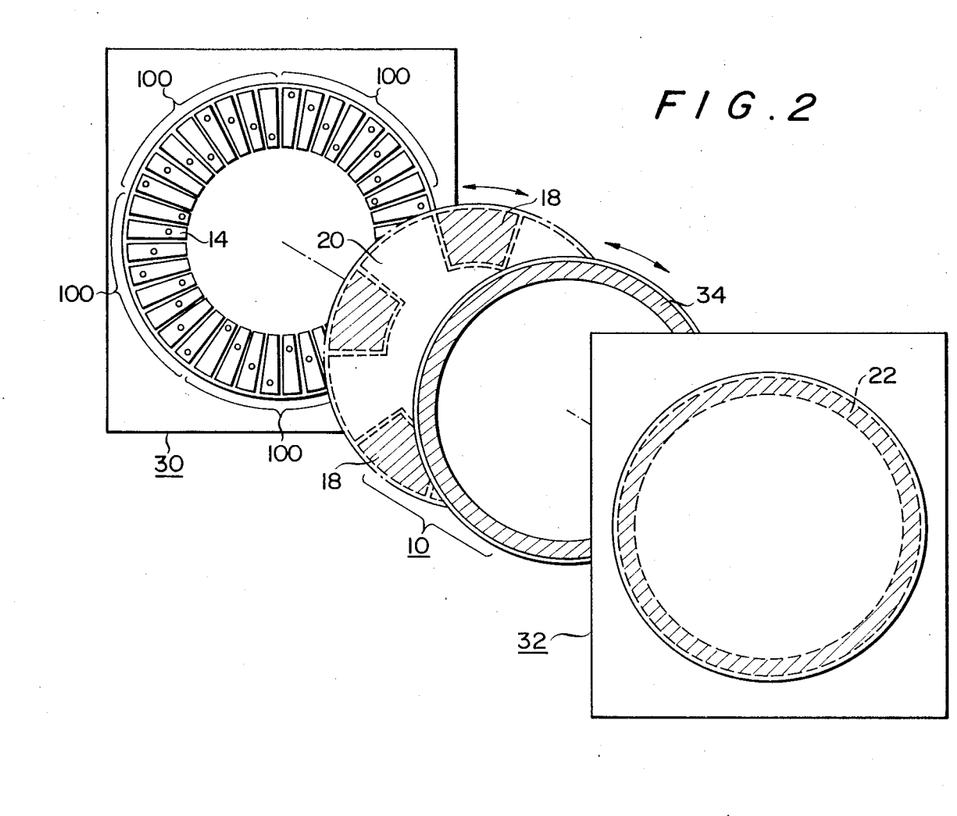
FIG. 2 is an illustration describing the composition of the electrodes in the encoder shown in FIG. 1.

FIG. 2 shows composition on the respective surfaces of the rotary disk 10, and the first and the second stationary disks 30 and 32 and the rotary disk 10 is shown dividedly into two facing surfaces for the first stationary disk side and for the second stationary disk side.

The present invention is characterized in that the improvement in the electrode composition provided on the surfaces of the rotary disk 10 and the first and the second stationary disks 30 and 32 enables the electrostatic capacity type encoder to be designed smaller in size and to increase the accuracy.

On the surface of the stationary disk 12 is arranged thereon a plurality of transmitting electrodes 14 at an equal distance therebetween along the circumference direction. To these electrodes 14 a voltage applying circuit 16 is connected to apply an alternating current of sinusoidal wave or rectangular wave shape one after another with a phase difference of a predetermined value, for example $\pi/4$ in the embodiment, and plural units of an electrode group 100 are formed of eight phase electrodes as one unit.

On the other hand, on the surface of the rotary disk 10 is arranged thereon the same number of the receiving electrodes 18 at the units of electrode group 100 so that they can face a series of predetermined transmitting electrodes 14 included in the respective units of the electrode group 100.

Furthermore, on the surface of the rotary disk 10 a ground electrode 20 is provided between the respective receiving electrodes 18 to prevent interference in the electrostatic capacity caused by interaction between the respective receiving electrodes 18 and other sources.

Therefore, the voltage $V_0$ shown in FIG. 9 is induced from the receiving electrodes 18 in accordance with the amount of rotating displacement in the rotary disk 10.

In the present invention, in order to pick up the voltage $V_0$ obtained through the receiving electrode 18 formed on the rotary disk 10 a coupling electrode 34 is provided on the surface of the rotary disk 10 which faces the second stationary disk 32. The coupling electrode 34 is electrically connected with the respective receiving electrodes 18.

In the embodiment, the coupling electrode 34 is formed in a ring shape along the circumference direction on the rotary disk 10.

On the surface of the second stationary disk 32 is provided thereon an output electrode 22 which faces the coupling electrode 34. In the embodiment, this output electrode 22 is formed in a ring shape along the circumference on the second stationary disk 32.

As described hereinabove, according to the encoder in the present invention, the electrostatic coupling between the coupling electrode 34 and the output electrode 22 enables the signal which is induced through the receiving electrodes 18, as is shown in FIG. 9, to be outputted from the output electrode 22.

The detected signal $V_0$ being outputted from the output electrode 22 is compared with the standard signal $V_1$ in the detector 36 and the amount of rotating displacement in the rotary disk 10 is detected in accordance with the phase difference $\phi$.

According to the present invention, as described heretofore, by means of the transmitting electrodes 14 provided on the first stationary disk 30 and the receiving electrodes 18 provided on the rotary disk 10, the signal shown in FIG. 9, that is, the signal $V_0$ corresponding to the amount of rotating displacement in the rotary disk 10 is generated on the receiving electrodes 18, and this signal $V_0$ is picked up from the output electrode 22 by the electrostatic coupling between the coupling electrode 34 provided on the rotary disk 10 and the output electrode 22 provided on the second stationary disk 32. The transmitting electrodes 14 and the output electrode 22 are facing each other with the receiving electrodes 18 and the coupling electrodes 34 are arranged therebetween so that the interference occurring between the electrodes 14 and 22 can be sufficiently controlled and the signal $V_0$ can be outputted from the output electrode 22 with a high S/N ratio.

According to the present invention, on the respective surfaces of the first stationary disk 30, the rotary disk 10 and the second stationary disk 32 are provided thereon only one kind of electrode per disk except the ground electrode, that is, the transmitting electrode 14, the receiving electrodes 18, the coupling electrodes 34 and the output electrode 22. It is not necessary to consider the interference in the electrostatic capacity among the different electrodes on the respective surface of the disks. Accordingly, the respective surface areas of the rotary disk 10 and the first and the second stationary disks 30 and 32 to be used to accommodate the respective electrodes can be reduced so that the width of the device, that is, in the radial direction of the rotary disk 10, can be designed much thinner if measuring results are satisifactory with the same accuracy or the same resolution as the conventional encoder, and the encoder itself can be designed to be smaller in size in total.

Incidentally, the encoder in the present invention becomes thicker in the direction of the rotary shaft 10a by the thickness of the second stationary disk 32, which is additionally installed in the present invention, when compared with the encoder in the prior art. However, the distances between the rotary disk 10 and the first stationary disk 30 or the second stationary disk 32 are extremely narrow, about 1/10 mm in this embodiment, and the increase in thickness in the axial direction of the rotary shaft 10a resulting from the addition of the second stationary disk 32 can be ignored.

Figure 3:
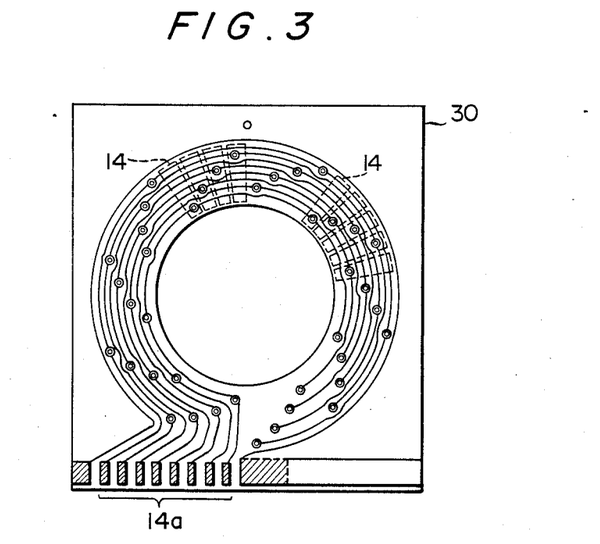
FIGS. 3 and 4 are illustrations showing the wiring for the transmitting electrodes and the output electrode in the encoder of the embodiment.
Figure 4:
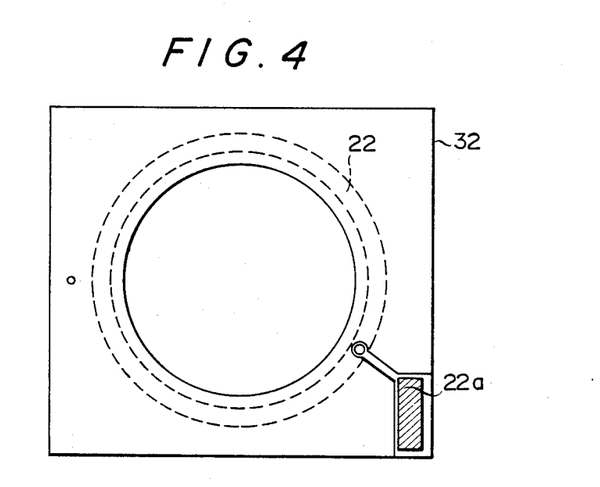

According to the present invention, since the transmitting electrodes 14 and the output electrode 22 are separately provided on the separate stationary disks 30 and 32, the wiring of the electric circuits 14a to be connected with the transmitting electrodes 14 can be simply arranged on the reverse side of the first stationary disk 30 as shown in FIG. 3 without extending around and the wiring of the electric circuits 22a to be connected with the output electrode 22 can be arranged sufficiently separately from the circuits for the transmitting electrodes 14 on the reverse side of the second stationary disk 32, as is shown in FIG. 4. Consequently, according to the present invention, both of the electric circuits 14a and 22a can be simply wired and the interference in the electrostatic capacity between both of the wirings can be remarkably decreased so that the preferred detective signal $V_0$ can be outputted with low noise from the output electrode 22 mixed therein.

According to the present invention, each of the transmitting electrodes 14 and output electrodes 22 in independently formed on each of the first stationary disk 30 and the second stationary disk 32. Therefore, the voltage applying circuit 16 applying the voltage to the transmitting electrodes 14 and the detector 36 being the input signal $V_0$ from the output electrode 22 can be separately arranged on the opposite side from each other with the rotary disk 10 provided therebetween, which enables the electric wiring simple and interference in the electrostatic capacity as a result of interaction between the circuits 16 and 36 can be easily prevented.

As described heretofore, according to the electrostatic capacity type encoder in the present invention, the device is totally designed to be smaller in size and to prevent noise from being mixed therein to cause interference in the electrostatic capacity so as to enable the accuracy to be highly increased.

Consequently, the application of the electrostatic capacity type encoder of the present invention as part of a measuring apparatus, for example, with such composition that the rotary disk 10 rotates in accordance with the displacement of an object to be measured, makes it possible to design the apparatus to be smaller in size in total and to measure the displacement with high accuracy.

Figure 5:
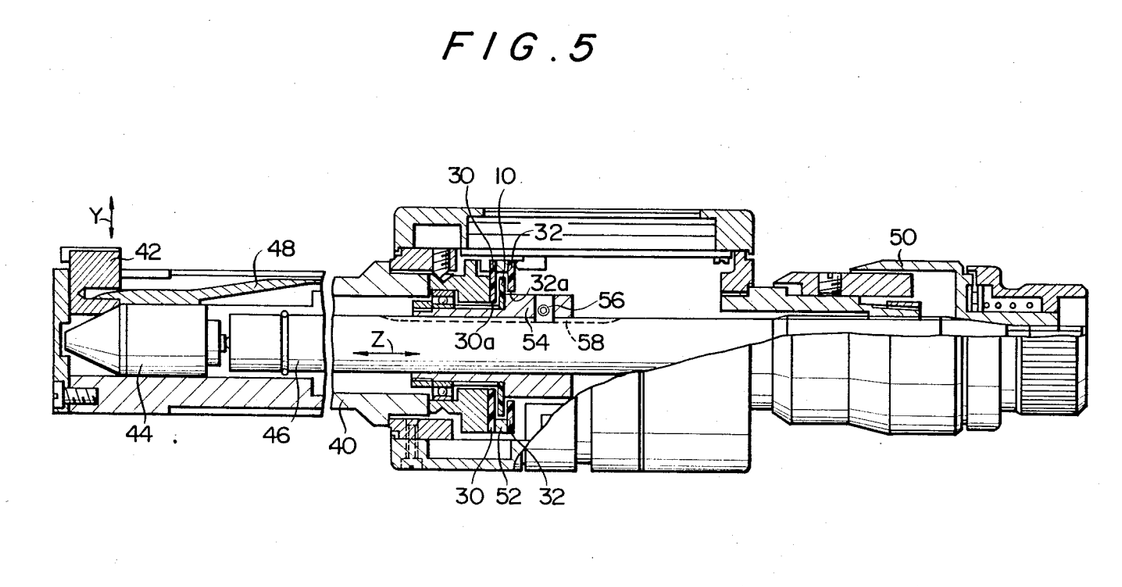
FIG. 5 is an illustration describing the composition of a measuring apparatus using the encoder of the present invention.

In FIG. 5 shown therein is a case that the electrostatic capacity type encoder in accordance with the teachings of the present invention is applied to an apparatus measuring the inner diameter of a workpiece. The measuring apparatus in the embodiment includes an inner diameter probe 42 which is formed in a cylindrical shape and attached to the tip end of the frame body 40 to move forward and back toward its radial direction shown by the arrow Y, and a spindle 46 which is contained within the frame body 40 and engages with the inside of the probe 42 at its tip end 44 to move forward and back toward its axis direction shown by the arrow Z.

In the embodiment, probes 42 are attached at three places on the tip end of the frame body 40 at an angle of 120 degrees respectively. Each of the probes 42 is urged toward its inside direction by leaf springs 48 to engage with the spinde 46 at its tip and 44.

The tip end 44 of the spindle 46 is formed in a conic shape and the inner surface of the respective probes 42 is cut out to fit and engage along the conic shape of the tip end 44.

In the measuring apparatus, a thimble 50 slidingly provided with the spindle 46 is operated to rotate so that the spindle 46 can be moved forward and back toward its axis direction shown by the arrow Z in order to enable its tip end 44 to move the probes 42 forward and back toward their radial direction.

Therefore, the inner diameter of the work can be detected as the displacement of the spindle 46 to the Z direction by means of detecting when the three probes 42 attached to the tip end of the frame body 40 come into contact with the inner surface of the work at three positions.

In the measuring apparatus of the embodiment, the displacement in the spindle 46 is detected by use of the encoder in accordance with the teachings of the present invention and the electric signal pulse in accordance with the detected displacement is inputted to a counter, which counts the electric signal pulse outputted from the encoder. The counted value is displayed at a digital display provided on the side of the frame body 40 in a digital representation.

The encoder to be used in the apparatus in the embodiment includes the first and the second stationary disks 30 and 32 fixed to the frame body 40 and the rotary disk 10 provided between the first and the second stationary disks 30 and 32 to rotate in accordance with the rotation of the spindle 46.

The first and the second stationary disks 30 and 32 are formed in a doughnut shape. The spindle 46 is fixed to the base 52 of the frame body 40 in such a way that the spindle 46 penetrates through the openings 30a and 32a provided in their centers so as to move forward and back.

The rotary disk 10 is also formed in a doughnut shape to be mounted on a rotary cylinder 54 which is rotatingly provided around the circumference of the spindle 46, and arranged to face the first and the second stationary disks 30 and 32.

An engaging pin 56 is provided in the inner circumference of the rotary cylinder 54 to engage with a key groove 58 provided along the axis of the spindle 46 on its outer circumference.

Therefore, when the thimble 50 is operated and rotated to revolve and move the spindle 46 forward and back toward its axis direction Z as shown in the Figures, the engagement between the pin 56 and the key groove 58 enables the rotary cylinder 54 to rotate, and the rotary disk 10 rotates with predetermined clearances kept between the rotary disk 10 and the first stationary disk 30 or the second stationary disk 32 in accordance with the displacement of the spindle 46.

Consequently, according to the apparatus in the emobdiment, the displacement of the probe 42 toward its radial direction shown by the arrow Y can be accurately detected as the amount of rotating displacement in the rotary disk 10 by use of the encoder in accordance with the teachings of the present invention so that the inner diameters of various workpieces can be measured with high accuracy.

In the embodiment described hereinabove, the description is limited to such a case that the encoder according to the present invention is applied to the measuring apparatus to measure the inner diameter of the work as an example. It is apparent, however, that the present invention does not limit its application only to the above mentioned measuring apparatus, but also applies to a micrometer, a dial gauge, a microgauge, and other measuring apparatuses.

As described heretofore, according to the present invention, obtained is an electrostatic capacity type encoder which enables the device to be designed to be samller in size in total and the detect the amount of rotating displacement in a rotary disk with high accuracy.

What is claimed is:

1. An electrostatic capacity type encoder comprising:
   a rotary disk rotatingly secured to a rotary shaft of an encoder body; and
   a first stationary disk and a second stationary disk fixed to the encoder body facing in parallel to each other with said rotary disk arranged therebetween,
   a plurality of transmitting electrodes to which alternating currents from a source of electrical power with respective different phases are applied and said transmitting electrodes transmits a signal, wherein said transmitting electrodes are arranged on a flat surface of said first stationary disk at an equal distance therebetween along its circumference, a plurality of receiving electrodes for receiving said signal from the transmitting electrodes are provided on one side of said rotary disk facing said transmitting electrodes on the first stationary disk, a coupling electrode connected to said plurality of receiving electrodes for receiving said signal from said receiving electrodes is provided on the other side of the rotary disk, and an output electrode for receiving said signal from said coupling electrode is provided on one side of said second stationary disk facing said coupling electrode,
   whereby the amount of relative rotating displacement of said rotary disk to said first stationary disk is determined by a signal detector based on periodic variations in electrostatic capacity signals which are outputted from said output electrode.

2. An electrostatic capacity type encoder according to claim 1, wherein said first stationary disk is provided with at least two sets of electrode groups mounted thereon, each set consisting of eight transmitting electrodes to which transmitting voltages with different phases are applied, and said rotary disk is provided with at least two sets of receiving electrodes facing said electrode groups on the first stationary disk.

* * * * *